(12) United States Patent
Dyson et al.

(10) Patent No.: US 6,269,399 B1
(45) Date of Patent: *Jul. 31, 2001

(54) GATEWAY SYSTEM AND ASSOCIATED METHOD

(75) Inventors: Laurie A. Dyson, Lakewood; Fredrick W. LeBlanc, Arvada; Thomas L. Scherer, Littleton, all of CO (US)

(73) Assignee: Qwest Communications International Inc., Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,374

(22) Filed: Dec. 19, 1997

(51) Int. Cl.[7] ....................................... G06F 13/00
(52) U.S. Cl. ............................................... 709/224
(58) Field of Search ................... 379/112; 712/1; 709/224

(56) References Cited

U.S. PATENT DOCUMENTS 5,168,570 * 12/1992 Eckert .................................. 710/241
5,625,669 * 4/1997 McGregor ............................. 379/58
5,638,430 * 6/1997 Hogan ................................. 379/112
5,920,898 * 7/1999 Bolyn .................................. 711/167

OTHER PUBLICATIONS

MQSeries Version 5, The Next Generation, introduction, overview, sections 1–1 through 4–4; 1997; 8 pages.

* cited by examiner

*Primary Examiner*—Eric Coleman
(74) *Attorney, Agent, or Firm*—Marsh Fischmann & Breyfogle LLP

(57) ABSTRACT

A system and associated method for securely exchanging information between first and second parties is disclosed, the first party being a wholesale of telecommunications services, such as wireless communications services, and the second party being a reseller of the telecommunications services of the first party. The gateway system of the present invention includes at least a first queue system associated with the first party for securely transferring messages to a second queue system accessible by the second party on corresponding queues, a firewall for securely routing the messages, and a processor for validating the messages in accordance with a contract between the first and second parties, the contract having provisions directed to the provision of such telecommunications services.

23 Claims, 6 Drawing Sheets

GATEWAY SYSTEM AND ASSOCIATED METHOD

FIELD OF THE INVENTION

The present invention generally relates to communication systems, and in particular, to a system and associated method for exchanging information between first and second parties.

BACKGROUND OF THE INVENTION

The Telecommunications Act of 1996, passed on Feb. 1, 1996, was the first significant revision to the Communications Act of 1934. Section 251 of the Act of 1996 stated that each local exchange carrier had a duty not to prohibit and not to impose unreasonable or discriminatory conditions or limitations on the resale of its telecommunications services. For instance, local exchange carriers had a duty to offer for resale at wholesale rates any communications service that the carrier provides at retail to subscribers who are not telecommunications carriers and not to prohibit and not to impose unreasonable or discriminatory conditions or limitations on the resale of such telecommunications service. In this regard, there is a need for a system for accommodating the resale of a carrier's telecommunications services.

SUMMARY OF THE INVENTION

Accordingly, it is an object of the present invention to provide a system and method for exchanging information between a first telecommunications party and a second telecommunications party or parties, the second telecommunications party or parties being a reseller of services provided by the first telecommunications party, a wholesaler of such services.

It is a further object of the present invention to provide a system and method which provides for the secure exchange of information between first and second telecommunications parties, the second party being a reseller of services of the first party.

It is yet another object of the present invention to facilitate only valid business transactions between a first party wholesaler of telecommunications services and a second party reseller of the telecommunications services of the first party.

It is another object of the present invention to record potential transaction violations, and to archive certain sensitive transactions, such as billing records for subscribers associated with a second party reseller of telecommunications services of the first party.

The present invention accomplishes one or more of these objectives by providing a gateway system and associated method for exchanging information between a first party and a second party in accordance with a plurality of conditions in a contract between the first and second parties. According to the present invention, the gateway system for exchanging information between a first party and a second party, in accordance with a plurality of conditions of a contract between the parties, includes a first queue system associated with the first party, the first queue system having a plurality of queues for exchanging information (e.g., messages) with a second queue system associated with the second party, the second queue system having a corresponding plurality of queues, and a firewall system interposed between the first and second parties for securely routing information between the first and second parties. Specifically, for purposes of securely exchanging information without providing the second party direct access to internal systems of the first party, the first queue system is capable of sending and receiving messages to and from the second queue system by utilizing corresponding queues of the first and second queue system to exchange messages. More specifically, in one embodiment, where the system of the present invention is utilized for exchanging information between first and second telecommunications parties, whereby the second telecommunications party is a reseller of telecommunications services (e.g., wireless communications) offered by the first party, the first queue system may be configured to send and receive messages to and from the second queueing system accessible by the second party, whereby the message traffic between the parties is unidirectional between corresponding queues. In this regard and in accordance with the present invention, a first of the plurality of queues of the first queue system may receive at least a first request from the second party, the first request being sent to the first party via a corresponding first queue of the second queue system associated with the second party. Further, in instances where the first party would like to communicate a response to the first request from the second party, the system of the present invention includes a second of the plurality of queues of the first queue system for sending to the second party a first response to the first request. Correspondingly, the second queue system includes a second of the plurality of queues for receiving the first response from the second of the plurality of queues of the first queue system. In one embodiment, the first and second queue systems are housed on a single computer associated with the first party, behind the firewall interposed between the first and second parties, whereby the system of the present invention allows the second party access the second queue system via routers associated with the firewall system. In another, preferred embodiment, the first and second queue systems are on separate computers with a firewall system interposed therebetween. As such, the system of the present invention allows the first and second parties to communication without giving the second party direct access to internal systems of the first party.

In one embodiment, the first queue of the first queue system associated with the first party is capable of receiving service activation requests (e.g., messages) from the corresponding first queue of the second queue system accessible by the second party, the service activation requests being related to subscribers of a telecommunications service (e.g., wireless communications) associated with the second party. For example, a first service activation request from the second party may concern activating a telecommunications service for new subscriber associated with the second party, deactivating a telecommunications service for a current subscriber associated with the second party, or activating, deactivating or changing a calling feature associated with a particular subscriber of the second party.

In another embodiment, a request or message sent to the first party from the second party may concern problems with the telecommunications service (e.g., problems concerning coverage in certain geographic areas or features associated with a particular subscriber or subscribers' services). In this regard, the first queue system of the present invention includes another queues for exchanging information related to trouble reports with a corresponding queue of the second queue system associated with the second party. In this embodiment, the first queue system includes a third queue for receiving at least a first trouble report request from the second party, the first trouble report request being sendable to the first queue via a third queue of the second queue system associated with the second party. Further, for purposes of providing information relating to the status of reported problems, the first and second queue systems may also include corresponding fourth queues, whereby the fourth queue of the first queue system is capable of sending a first response to a first trouble report request to the second party, the first response being receivable on the corresponding fourth queue of the second queue system, which is accessible by the second party. In instances where the first trouble report request is invalid (which will be described in more detail hereinbelow), an error response may be transmitted from the first party to the second party on another pair of corresponding queues or, alternatively, on the fourth queues of the first and second queue systems.

In another aspect, the first queue system may include another queue for sending (e.g., transmitting) call detail record information for a particular call made or received by a subscriber associated with the second party to a corresponding queue of the second queue system accessible by the second party. Yet another queue of the first queue system may be utilized to send at least a first abnormal condition report to the second party. Such abnormal conditions concern abnormal conditions (e.g., outages) in the network of the first party, or warnings of abnormal conditions. In this regard, the first queue system is also capable of sending (e.g., transmitting) information to the second queue system, whereby information, such as call detail records or abnormal condition reports, are sendable (e.g., transmittable) on respective queues of the first queue system and receivable on corresponding respective queues of the second queue system. The first and second queue system may further include additional queues, different than the queues described hereinabove, for exchanging messages relating to errors in specific call detail records and corrected call detail records sendable (e.g., transmittable) to the second party in response thereto.

The system of the present invention may further include a validation processor for validating requests from one or more resellers or a call detail record for a subscriber associated with a reseller, such validation in accordance with at least a first of the plurality of conditions between the first party and a particular reseller, whereby the plurality of conditions correspond to the provisions of a contract between the first party a particular reseller, such as the second party. Contract-related information is storable in a validation database having at least one look-up table, the database being in communication with the validation processor. In particular, the validation processor utilizes a "rule engine" to interpret validation rules for each contract between the first wholesaler telecommunications party and the second party reseller(s) of telecommunications services and applies such validation rules to the message traffic (e.g., requests) flowing between the first and second parties on theist and second queue systems. Alternatively, the validation processor utilizes a fuzzy logic system, stored procedures or an expert system to interpret and apply such validation rules.

As noted hereinabove, in one embodiment, the system of the present invention may be used to exchange information between a first party wholesaler of telecommunications services and a second party reseller of the telecommunications services of the first party. In such circumstances, the contract between the parties governs the provision of such telecommunications services. For example, in instances where the second party is a reseller of the first party's wireless communications services (e.g., personal communication services (PCS)), the plurality of conditions of the contract between the first and second parties may concern the area of coverage and the particular calling features which can be offered by the second party to its subscribers. In this regard, the validation processor is in communication with at least the first queue system and other internal systems of the first party. In one embodiment, where the first of the plurality of requests from the second party is sent to the first party via the first of the plurality of queues of the second queue system to the first of the plurality of queues of the first queue system, and involves a service activation request for a particular subscriber associated with the second party reseller of telecommunication services, such service activation request is communicated to the validation processor. The validation processor reviews at least the first of the plurality of requests relating to service activation features available to second party subscribers by comparing such requests against the service activation conditions and provisions of the contract between the first and second parties, such conditions and provisions being stored within the validation database. If the first request relating to a service activation feature is valid (e.g., authorized feature in the contract), the feature may be activated by an internal system associated with the first party and a response (e.g., message) indicating such activation may be sent to the second party via second queues of the first and second queue systems. In instances where requests or reports are invalid, the system utilizes a contract violations database to review and record such invalid requests and records, and a response (e.g., message) indicating such invalid request may be sent to the second party via the second queues of the first and second queue systems.

The validation processor may be also used in connection with validating trouble report requests from the second party to ensure only authorized coverage areas and features contained in the contract between the first and second parties are addressed or statused by the first party. The validation processor also may be used in connection with validating call detail records for calls initiated by a subscriber associated with the second party to glean evidence of fraudulent use of calling features and coverage areas outside of the authorized calling features and coverage areas, as provided for in the contract between the first and the second telecommunications parties. In this regard, for call detail records, the validation processor is capable of determining the particular reseller (e.g., second party) to which the subscriber who initiated or received the first call, per the subscriber's NPA NXX (e.g., numbering plan area and office code), is associated, determining the switch identification and validating that the base station utilized for the first call is authorized for use by subscribers of this particular reseller. For abnormal condition reports, the validation processor may be used to determine which of a possible plurality of resellers associated with the first party has been or may be affected by a present or future abnormal condition.

According to another aspect of the present invention, a method for exchanging information between first and second parties in accordance with a plurality of conditions in a contract between the first and second parties is provided. Generally, the method includes the steps of retrieving on a first queue of a first queue system in communication with the first party at least a first of a plurality of requests sent from the second party via a corresponding first queue of a second queue system in communication with the second party, processing at least the first of the plurality of requests, and responding to the first of the plurality of requests with a first of a corresponding plurality of responses by sending the first of the plurality of responses to the second party on a second queue of the first queue system, the first of the plurality of responses being receivable on a corresponding second of the plurality of queues of the second queue system associated with the second party. Of importance, the processing step includes at least the step of validating at least the first of the plurality of requests in accordance with at least a first of the plurality of conditions of the contract between the first and second parties, the first party being a wholesaler of telecommunications services (e.g., PCS wireless services), and the second party being a reseller of telecommunications services of the first party.

In one embodiment, where the first of the plurality of requests is a service activation request for a subscriber associated with the second party, the processing step comprises validating the first service activation request in accordance with the calling features and coverage areas as authorized in the contract between the first and second parties. The processing step may also include examining the first service activation request for errors, such as syntax errors. In the event the first service activation request is validated (e.g., valid), the processing step may further comprise the step of activating, deactivating or changing a subscriber's service using internal systems associated with the first party. In the event that the service activation request is invalid (e.g., requests outside provision of contract), the processing step may further include logging the service activation request into the contract violations database for further review by the first party and sending an error message to the second party, or alternatively, electing not to send an error message to the second party. In any event, the processing step may include the step of generating a response to the service activation request, the response indicating that the requested service has been approved and activated, disapproved, or had errors in the request. The step of responding may thus include sending a response or message to the second party via corresponding queues of the first and second queue systems, the queues being different than those used to send and receive requests for service activation.

In instances where the first of the plurality of requests concerns a trouble report request from the second party, the processing step may include validating the first trouble report request with at least a first of the plurality of conditions or provisions in the contract between the parties. In this regard, the validating step concerns ensuring only authorized coverage areas and authorized features are investigated and statused, as delineated in the contract between the first and second parties. The processing step may also include examining the first trouble report request for errors, such as syntax errors. In the event such first trouble report is valid, the processing step may further include the step of statusing the trouble using internal systems associated with the first party and generating at least a first status response related to the first troubler report request, and the step of responding to the first trouble report includes sending at least one status response to the second party on another pair of corresponding queues of the first and second queue systems. If the first trouble report is invalid, the processing step includes logging such violation into a contracts violations database for further review by the first party and generating an appropriate response thereto, and the step of responding includes sending an appropriate response to the second party utilizing the pair of corresponding queues of the first and second queue systems. Of course, the first party may elect not to send any response to the second party in such instances.

In another embodiment, the method includes the steps of processing at least one of at least a first call detail record corresponding to a call initiated by or terminated to a first subscriber associated with the second party and a first abnormal condition report relating to services which may affect service for subscribers of a particular reseller, such as the second party, validating the first call detail record or the first abnormal condition report and sending the first call detail record or the first abnormal condition report to the second party reseller via another pair of queues of the first and second queue system associated with the first and second parties. In instances where the method involves at least a first call detail record, for purposes of traceability, the processing step can include the step of assigning a unique serial number and/or time/date stamp to the call detail record. The step of validating the first call detail record can include the steps of determining the particular reseller to which the first subscriber, per the subscriber's numbering plan area and office code (i.e., NPA NXX) is associated, validating the switch identification in accordance with the spectrum basic trading area, and validating the base station utilized for the call. The step of processing the first abnormal condition report may include receiving information relating to a present or anticipated outage and service areas and features affected by such outage from internal systems associated with the first party. In such circumstances, the step of validating includes determining which of the particular resellers (e.g., second party) on contract with the first party are affected by the particular outage. In this regard, at least a first message may be then be generated and sent (e.g., transmitted) to the affected resellers, such as the second party, via, for example, the above-identified pair of queues of the first and second queue systems associated with the first and second parties. In this regard, the present invention facilitates the exchange of information affecting service to subscribers of the second party.

DETAILED DESCRIPTION

FIGS. 1–4 generally illustrate the various embodiments of the gateway system and associated method of the present invention for exchanging information between first and second parties. The gateway system and associated method of the present invention are particularly useful in securely exchanging information between first and second telecommunications parties, whereby the first party is a wholesaler of telecommunications services, such as wireless, personal communications services) and the second party is a reseller of the telecommunications services of the first party. In this regard, subscribers associated with the second party (e.g., wireless customers) may arrange for the provision of wireless communications with the second party, such services being in accordance with the provisions or conditions of the contract between the first and second parties, and information related thereto, including service activation requests and responses, trouble report request and responses, call detail records and abnormal condition reports, may be communicated between the first and second parties via the gateway system of the present invention.

As indicated hereinabove, subscribers of wireless telecommunications services of the second party would only be entitled to certain calling features and would only be authorized to initiate calls in a designated coverage area(s), as provided for in the contract between the first and second parties. The gateway system and associated method of the present invention provide the means by which information, such as service activation requests, trouble report requests, call detail reports and abnormal condition reports, may be securely exchanged between the first and second parties in accordance with the provisions of the contract between the first and second parties, without providing to the second party direct access to internal systems of the first party wholesaler of the telecommunications services.

Figure 1:
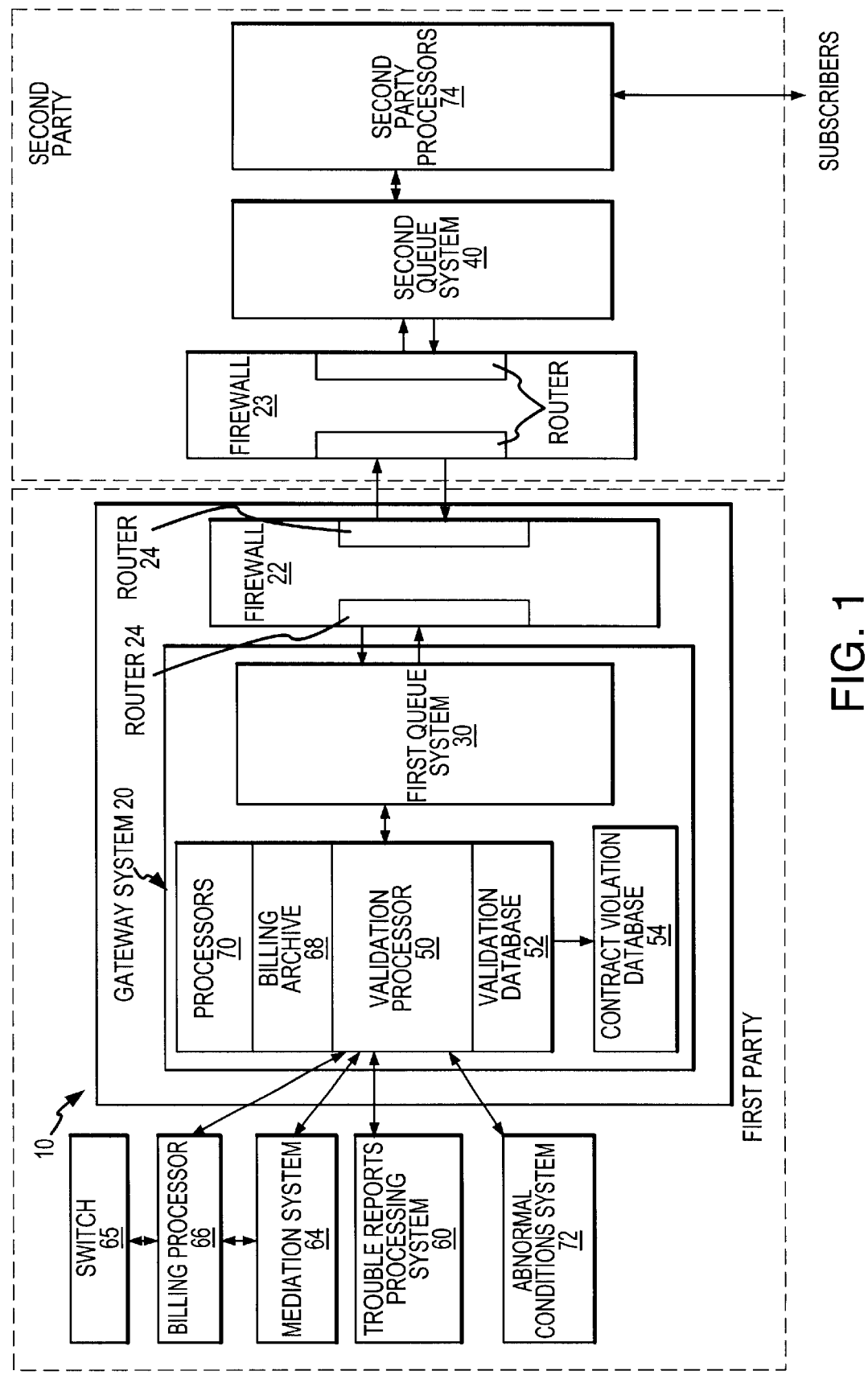
FIG. 1 illustrates a high level block diagram of the gateway system of the present invention.

Referring to FIG. 1, the system 10 of the present invention includes a gateway system 20 for exchanging information between the first and second parties and firewalls 22, 23 for processing and routing communications between the first and second parties via routers 24. In particular, the gateway system 20 includes a first queue systems 30 for sending and receiving messages to and from a second queue system 40 associated with second party, the first queue system 30 being accessible by the first party for receiving and sending messages from and to the second party, and the second queue system 40 being accessible by the second party, for sending and receiving messages to and from the first party via the firewalls 23, 22 into the first queue system 30. First and second queue systems 30, 40 are commercially available from IBM as MQSeries Messaging systems, although other queue systems may be used. In instances where the second party wishes to communicate with the first party regarding telecommunications services being resold by the second party, the second party's processors 74 can send and retrieve messages or other communications through the firewall systems 23, 22 by interfacing with the second queue system 40 and routers 24 associated therewith, the queues of the second queue system 40 being correspondingly linked with queues of the first queue system 30. A communications data circuit (not shown) may be used to communicate messages in various conventional manners.

Figure 2:
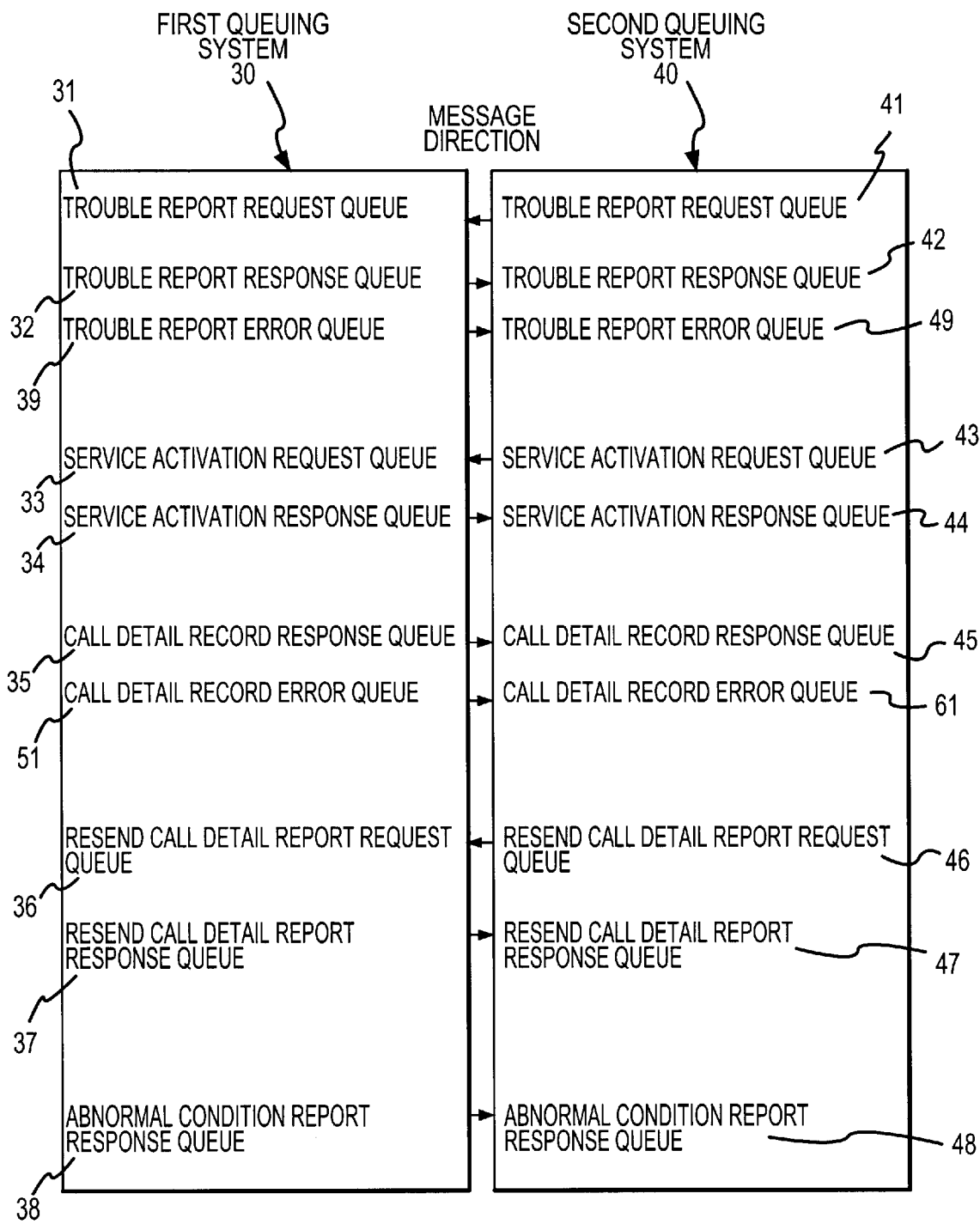
FIG. 2 illustrates the queues of the first and second queue system illustrated in FIG. 1.
Figure 3A:
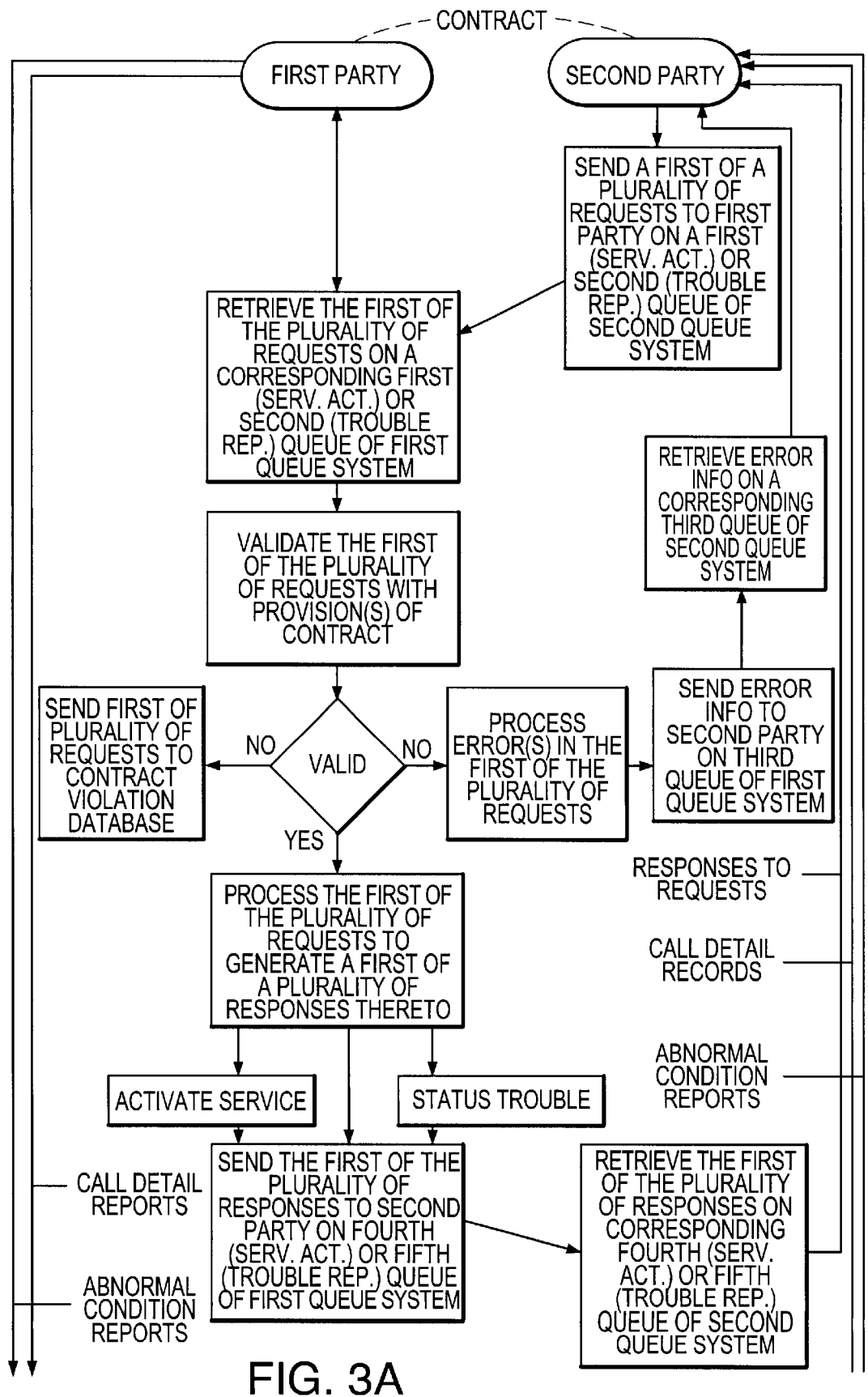
FIGS. 3A–3C is flow chart of the method of the present invention, illustrating the steps performed when exchanging different types of information between the first and second parties.
Figure 3B:
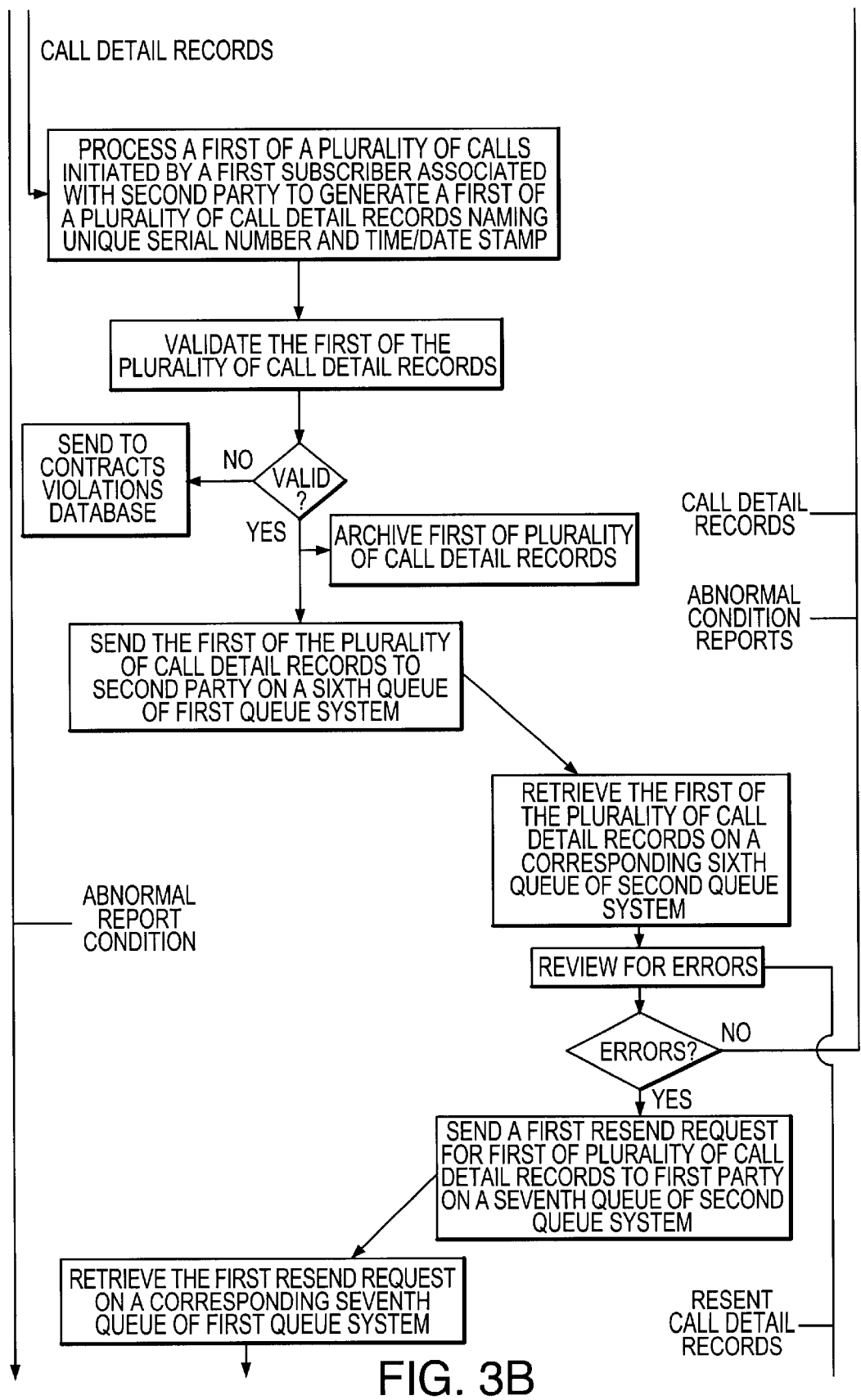
Figure 3C:
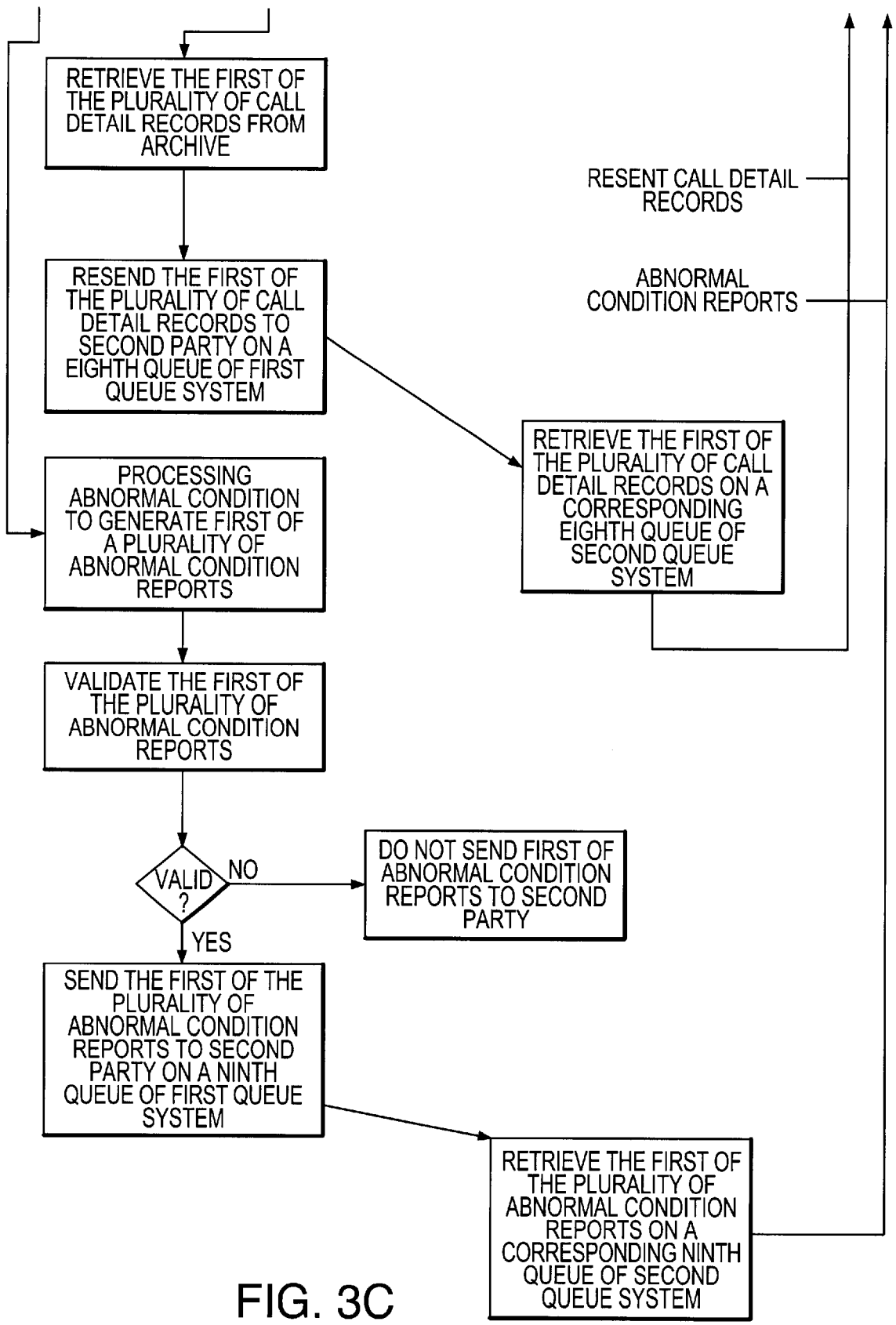

Generally, and referring to FIGS. 1–2, the first and second queue systems 30, 40 include a plurality of queues for exchanging information from one queue to another corresponding queue. First and second queue systems 30, 40 contain a corresponding number of queues, whereby a first 31 of the plurality of queues of the first queue system 30 correspond to a first 41 of the plurality of queues of the second queue system 40. Further, messages exchanged between corresponding queues only travel in one direction. In this regard, a first trouble report request or message from the second party concerning service problems relating to at least one subscriber associated with the second party may be forwarded from the second party to the trouble report request queue 41 which forwards the message (e.g., trouble report request) to the first party and specifically, to the corresponding first queue 31 for receiving trouble report requests from the second party's first queue 41 of the second queue system 40. Upon receipt of the first trouble report request in the first trouble report request queue 31 of the first queue system 30, the first trouble report request is forwardable to (e.g., via a processor 70) or otherwise retrievable by the validation processor 50 (e.g., via processor 70), which is capable of validating the request in accordance with the contract between the first and second parties. In this regard, the validation processor 50 is capable of accessing data corresponding to contract provisions in the validation database 52 to compare the request with, for example, information concerning authorized coverage areas and calling features, as delineated in the contract between the first and second parties (which will be described in more detail hereinbelow). If valid, such trouble report may then be forwarded (e.g., via an SQL NET) to a trouble report system 60 associated with the first party for tracking and statusing of the trouble reports. Upon a change in the status or date, the trouble report system 60 generates a message statusing the trouble report request, such message being routable to the second queue 32 of the first queue system 30 by the processor 70, the message being retrievable by the second party from the second queue 42 of the second queue systems 40. If invalid the processor 70 may forward the invalidated trouble report request to a contract violations database 54 associated with the validation processor 50 for further processing and review by the first party, and may or may not send the error response to the second party. In the event the first party elects to send an error message to the second party indicating such request was invalid, the first party may transmit such information to the second party via the trouble report error queue 39, which is retrievable by the second party on the corresponding trouble report error queue 49.

In the event a subscriber associated with the second party wishes to activate, deactivate or change one or more calling features (e.g., call forwarding, toll call blocking, caller identification, line blocking, call waiting, conference calling, voice messaging, line blocking, long distance carrier, mobile identification number, electronic serial number, etc.), including activation or deactivation of wireless services, a service activation request may be placed on a third 43 of the plurality of queues of the second queue system 40 and sent to the first party, the first party capable of receiving the service activation request on a corresponding third 33 of the plurality of queues of the first queue system 30 for receiving such service activation requests. Upon receipt, the service activation request is sendable to (e.g., via processor 70) or otherwise retrievable by the validation processor 50 (e.g., via processor 70) for validation. In this regard, the validation processor 50 is capable of accessing the validation database 52 to compare the request with authorized service activation features for the second party, as determined by the contract between the first and second parties and to identify the switch(es) servicing subscribers of the second party (as will be described in more detail hereinbelow). In this regard, the validation processor 50 for validating service activation requests is capable of examining the type of service requested, the service features authorized under the contract between the first and second parties, the particular provisions relating to thereto under the contract and the identifiers (e.g., numbering plan area and office code (NPA NXX)) for the particular subscriber to which the service activation pertains. In the event the service activation request is valid, a mediation system 64 internal to the first party receives the request (e.g., via another, separate queue system) to activate the particular subscriber's requested service. Thereafter, a response to the service activation request, for example indicating that the request has been approved or disapproved (e.g., invalid request), may be forwarded to the second party via a fourth 34 of the plurality of queues for service activation responses of the first queue system 30, the message to be received by a fourth queue 44 of the second queue system 40 for service activation response receipt. If the service activation request is invalid, the validation processor 50 forwards the request to the contracts violation database 54 for further review by the first party.

In instances where a first subscriber associated with the second party initiates a call or a call is otherwise terminated to the first subscriber utilizing the telecommunications systems and services (e.g., PCS wireless services) contemplated by the contract between the first and second party, a billing processor 66 internal to the first party processes a first call detail record corresponding to such call and forwards such call detail record to the validation processor 50 of the present invention to verify such call was made in accordance with the parameters of the contract between the first and second parties. In this regard, the validation processor 50 is capable of flagging fraudulent use of calling features and coverages not contained or authorized by the contract between the first and second parties (which will be described in more detail hereinbelow). Typically, the billing processor 66 associated with the first party is an internal system which is capable of assigning and affixing a unique serial number and processing date/time stamp to each call detail record, which facilitates subsequent retrieval and resend of a particular call detail record at the request of the second party reseller. The billing processor 66 may be in communication with the validation processor 50 and/or the first queue system 30 via a separate queue system. Call detail records generated by the billing processor 66 are sendable to the second party on a fifth 35 of the plurality of queues of the first queue system 30 for sending call detail record and is receivable on a corresponding fifth 45 of the plurality of queues of the second queue system 40, for receiving call detail record and are also storable in a billing archive 68. In certain circumstances, such as when a switch restarts or when there is an anomoly in the first party's network, a suspicious or corrupt call detail record may result. In such instances, the suspect call detail record may be forwarded to the second party on yet another queue 51 of the first queue system 30 and received by the second party on a corresponding queue 61 of the second queue system 40.

In the instances where a particular call detail record must be resent (e.g., due to incomplete record or lost records), the second party may place a message requesting such resending of a call detail record on a sixth 46 of the plurality of queues of the second queue system 40, the resend message being receivable and retrievable on the corresponding sixth 36 of the plurality of queues of the first queue system 30. Upon receipt, a processor 70 retrieves the requested call detail record, as selected by the unique record serial number or date/time stamp from a billing archive 68 associated with the first queue system 30. The retrieved call detail record may then be sent to a seventh 37 of the plurality of queues for resending call detail records on the first queue system 30, the resent record being receivable on a corresponding seventh 47 of the plurality of queues on the second queue system 40 associated with the second party.

The first queue system 30 may further include an eighth 38 of the plurality of queues for sending abnormal condition reports to the second party via a corresponding eighth 48 of the plurality of queues of the second queue system 40. In this regard, the first queue system 30 is in communication with an abnormal conditions system 72 (e.g., via an SQL NET), which is an internal system associated with the first party which is capable of noting network outages and configuration change notifications to pertinent resellers, such as the second party. The abnormal conditions system 72 is in communication with the validation processor 50, which determines, based upon the particular abnormal condition, which of the resellers associated with the first party are affected (e.g., the second party) and which stations or coverage areas are affected (as will be described in more detail hereinbelow). Thereafter, for abnormal conditions affecting the second party, the report is sendable to the second party via the eighth queues 38, 48 of the first and second queue systems 30, 40.

As noted hereinabove, a contract containing provisions relating to service features and coverage areas for subscribers of the second party generally governs the relationship between the first and second parties. In this regard, in one embodiment of the present invention, requests for information received from a second party are retrieved and validated by the first party in accordance with the provisions of the contract. For example, and referring to FIG. 3A, according to one embodiment of the method of the present invention, the method includes the steps of retrieving the first request from the second party on a queue (e.g., a first queue) of the first queue system associated with the first party, the first request being sent to the first party by the second party on a corresponding queue (e.g., a first queue) of the second queue system. As noted hereinabove, the first request includes a first service activation request for activation, deactivation or changes in service features relating to a subscriber associated with the second party (e.g., concerning activation/deactivation of wireless services, call forwarding, toll call blocking, caller identification, line blocking, call waiting, conference calling, voice messaging, line blocking, long distance carrier, mobile identification number, electronic serial number, etc.). The first request from the second party can instead concern a first trouble report request, whereby the second party submits requests for information concerning problems or trouble with service provided to the second party or its subscribers (e.g., dead zones of no coverage). Such trouble requests are sendable on a separate queue (e.g., a second queue) of the second queue system associated with the second party.

Upon receipt of at least the first request on corresponding queues of the first queue system (e.g., first queue for service activation requests, second queue for trouble report requests), the methodology contemplates validating the request, and specifically the message contained therein, with one or more provisions of the contract between the parties. In this regard, the method of the present invention also includes the step of validating at least the first request with at least a first provision of the contract, whereby data relating to the contract is storable in a validation database. The method of the present invention may also include validating at least the first request for syntax errors. If the first request is validated (which will be described in more detail hereinbelow), the method of the present invention further includes the step of processing at least the first request to generate a first response thereto, and acting upon such request. For example, in instances where the first request included a service activation request for a first subscriber, and such first request is valid, the first party may thereafter activate the service requested (or, conversely, deactivate, or change the service, depending upon the request), and send the first response indicating such activation was approved to the second party on another queue (e.g., a third queue) of the first queue system, the first response being receivable (i.e., retrievable) by the second party on a corresponding queue (e.g., a third) of the second queue system. In instances where the first service activation request was invalid (e.g., included errors), the method of the present invention includes the step of sending such invalid first service activation request to a contract violations database for later review by the first party. In addition, the method also includes transmitting the invalid first service activation request to the second party via corresponding queues of the first and second queue systems or, alternatively, electing not to transmit such invalid request to the second party.

In instances where the first request concerns a trouble report request and such trouble report request is valid (which will be described in more detail hereinbelow), the method includes the steps of processing the first trouble report request for action by the first party (e.g., statusing, investigating trouble report), and the returning the resulting status and response to the trouble report to the second party on another queue (e.g., a fourth queue) of the first queue system, the response relating to the trouble report request being receivable (e.g., retrievable) by the second party on a corresponding queue (e.g., a fourth queue) of the second queue system. Where the trouble report request was invalid (e.g., included errors), the method of the present invention includes the step of sending such invalid trouble report request to a contract violations database for later review by the first party. In addition, the method also includes transmitting the invalid trouble report request to the second party via corresponding queues of the first and second queue systems (e.g., the fourth queues or another pair of queues) or, alternatively, electing not to transmit such invalid request to the second party.

In another embodiment, the method of the present invention is directed to providing call detail reports to the second party to enable the second party to bill subscribers associated with the second party who have initiated calls which utilized the services and/or systems of the first party. In one embodiment, illustrated in FIGS. 3A–3B, the method of the present invention concerns processing at least a first call initiated by or terminated to a first subscriber associated with the second party to generate a first call detail record, validating the first call detail record associated with the first subscriber and, if valid, archiving the first call detail record for future reference and sending the first call detail record to the second party on a separate queue (e.g., a fifth queue) of the first queue system, the first call detail record for the first subscriber's call being receivable (e.g., retrievable) by the second party on a corresponding queue (e.g., a fifth queue) of the second queue system accessible by the second party. The steps of processing the first call initiated by a first subscriber associated with the second party to generate the first call detail record, validating the first call detail record in accordance with the contract between the parties and sending the first call detail record to the second party utilizing the queue systems of the present invention may be accomplished immediately after the first call is completed, to thereby provide the second party reseller with real time call detail records for their subscriber billing. In addition, for purposes of facilitating the retrieval of call detail records, for example, upon request by the second party, the processing step includes assigning a unique serial number and/or time/date stamp with each call detail record. In this regard, if an error is discovered by the second party and/or the second party wishes to have the first call detail record resent, the second party's message for the first resend request can include the unique serial number and/or time/date stamp to enable the first party to retrieve the first call detail record from the billing archive systems associated with the first party. In this regard, if errors exist, the second party can send a first resend request for the first call detail record to the first party on another queue (e.g., a sixth queue) of the second queue system, the first resend request for the first call detail record being receivable (e.g., retrievable), on a corresponding queue (e.g., a sixth queue) of the first queue system associated with the first party. Thus, the method of the present invention further includes, in instances where a first resend request has been received by the first party on a sixth queue of the first queue system, retrieving the first call detail record from the billing archives and resending the first call detail record to the second party on another queue (e.g, a seventh queue) of the first queues system, the resent first call detail record being receivable (e.g., retrievable) by the second party on a corresponding queue (e.g., a seventh queue) of the second queue system. In the event there are errors in a call detail record or a call detail record is otherwise incomplete (e.g., due to switch restart or anomoly in network), the method includes the step of sending or transmitting on yet another queue of the first queue system to a corresponding queue of the second queue system accessible by the second party a call detail record which is incomplete or has errors.

In another embodiment of the method of the present invention, the method is directed to informing the second party of any abnormal conditions in the first party's telecommunications systems and/or services to enable the second party to notify its subscribers of such abnormal conditions. For example, in instances where the first party's system has experienced a network outage, the method of the present invention allows the first party to notify the second party on a timely basis. In this regard, and referring to FIGS. 3A–3C, the method includes the steps of the first party processing an abnormal condition to generate a first abnormal condition report, validating the first abnormal condition report, and sending the first abnormal condition report to the second party on another queue (e.g., an eighth queue) of the first queue system, the first abnormal condition report being receivable (e.g., retrievable) by the second party on a corresponding queue (e.g., an eighth queue) of the second queue system. The step of processing the first of the plurality of abnormal condition reports can include the step of receiving reports from internal systems associated with the first party, the reports directed to outages and changes in services. The step of validating the abnormal condition report includes determining which of a plurality of resellers such abnormal condition affects (e.g., the second party) and which particular coverage areas and/or switches are affected. If a second party is validated, meaning subscribers relating thereto could be affected by the particular abnormal condition, the step of responding includes sending an abnormal condition report to the second party on the eighth queue of the first queue system, the report being receivable on the corresponding eighth queue of the second queue system. If the second party is not validated, meaning subscribers associated with the second party are not affected by the particular abnormal condition, no response or abnormal condition report is forwarded to the second party.

Figure 4:
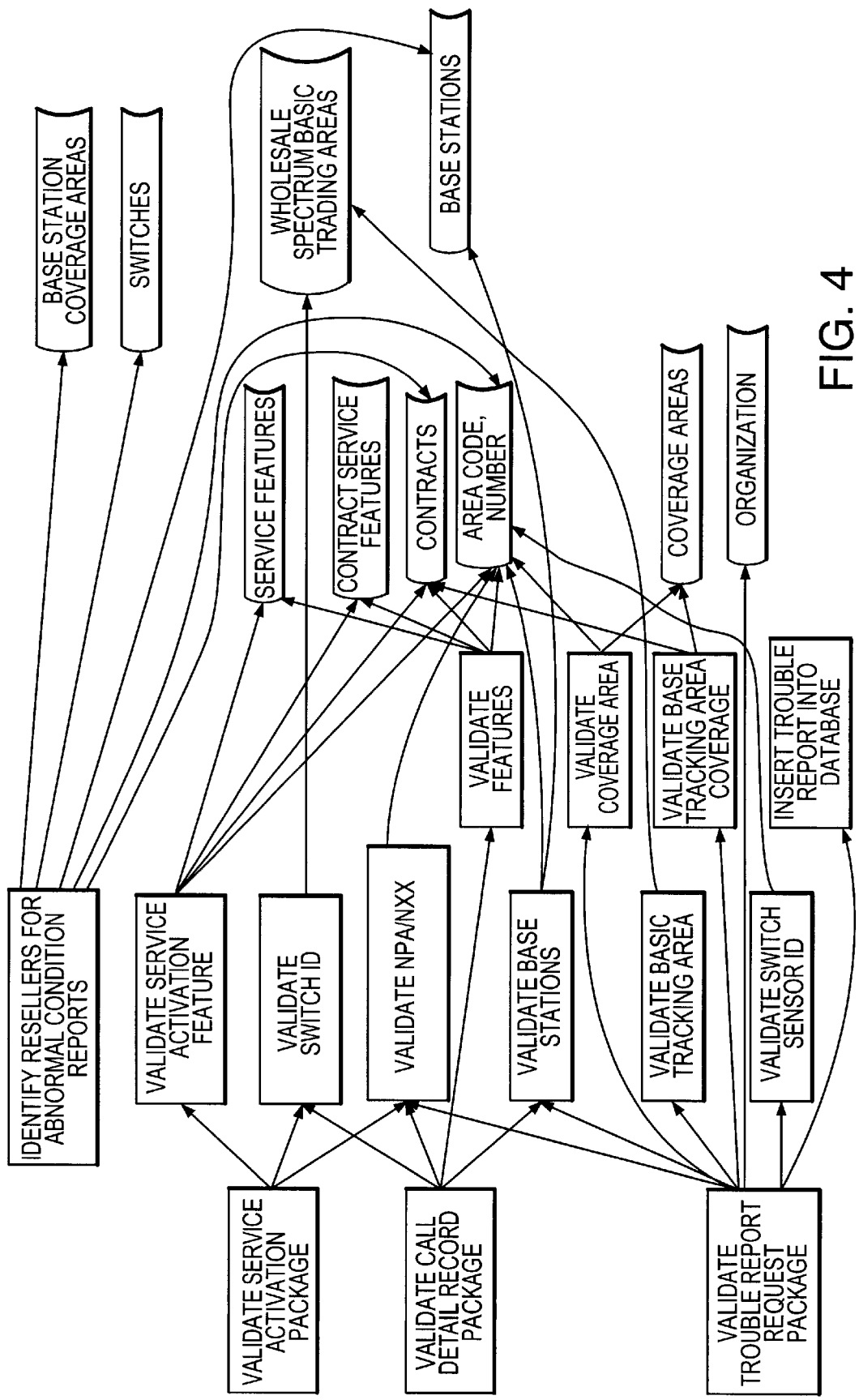
FIG. 4 illustrates a flow diagram of the validating steps of the method of the present invention.

FIG. 4 illustrates in detail the steps included in validating a service activation request, validating a trouble report request, validating a call detail report and validating an abnormal condition report. As indicated hereinabove, each of the validating steps requires the report or request to be validated with the conditions or provisions of the contract between the first party wholesaler of telecommunications services and the second party reseller of such services. For example, the step of validating service activation requests from the second party reseller can ensure only features and coverage areas contained within the contract between the first and second parties are activated. Similarly, the step of validating call detail records to be sent to the second party reseller for billing subscribers associated with the second party can flag evidence of fraudulent use of call features and coverages which are outside of the provisions of the contract between the first and second parties. The step of validating trouble report requests from the second party reseller can ensure only coverage areas and calling features contained in the contract between the first and second party are included in the trouble report request and investigated by the first party. The step of validating abnormal condition reports ensures primarily, and perhaps only, resellers which are or may be affected by the abnormal condition and who are on contract with the first party are notified.

In accordance with the flow diagram illustrated in FIG. 4, the step of validating a service activation request includes, among other things, validating the service activation feature requested, validating the switch identification, and checking the NPA NXX. The step of validating the service activation feature requires accessing a validation database which contains information, such as the types of service features available from the first party, the service features authorized for subscribers of the second party, per the contract between the first party wholesaler and the second party reseller, the particular contract involved (e.g., if the second party has more than one contract for more than one geographic area), and the subscriber's number to which the service activation request applies. The step of validating the switch ID (i.e., switch identification) includes determining the basic spectrum trading area, and the step of checking the NPA NXX includes the step of accessing the lookup tables in the validation database to compare the received subscriber's number to which the activation applies to verify the correct NPA NXX with the particular subscriber.

For validating trouble report requests received from the second party reseller, the validating step includes the step of checking the NPA NXX to determine the particular subscriber who, for example, reported the problem in service, validating the base station to which the trouble pertains, in accordance with the subscriber's number and base stations of the first party available to the second party's subscribers, validating that the basic trading area is an area served by the first party, validating that the coverage area within the basic trading area served by the first party is part of the coverage area, validating the switch sensor identification with the subscriber's number to determine whether the identified switch is problematic, and inserting into a trouble report database the trouble reported by the second party to track the problem.

As indicated hereinabove, the step of validating outgoing call detail records for calls initiated by subscribers of the second party reseller serve to flag fraudulent use of calling features and coverages not contained in the contract between the first and second parties. In this regard, after a call has been completed by a subscriber associated with the second party, the validating call detail records step includes determining the particular reseller to which the subscriber, per the subscriber's number (e.g., the NPA NXX), is associated, validating the switch identification in accordance with the spectrum basic trading area, and validating the base station utilized for the call to ensure only authorized base stations are utilized by the particular subscriber who initiated the call, in accordance with the base stations authorized for the resale area, per the contract between the first and second parties.

The step of validating abnormal condition reports generally validates which of a plurality of resellers (e.g., second party) should be notified of the particular abnormal condition to which the report pertains. In this regard, the step of validating includes the steps of determining which of the switches and/or base station coverage areas associated with the first party are affected, examining subscriber numbers which may be affected and determining, in view of contracts between the first party and resellers, which resellers are affected.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A system for exchanging information between a first party and a second party in accordance with a plurality of conditions of a telecommunications contract between the first and second parties, said system comprising:

a first queue system associated with the first party having a plurality of receiving queues, each of said plurality of receiving queues of said first queue system is configured for receiving at least a first of a plurality of requests from a corresponding transmitting queue of a second queue system associated with the second party, said first queue message system further comprising a plurality of transmitting queues for sending to a corresponding receiving queue of said second queue system associated with the second party at least a first of a plurality of responses to said first of said plurality of requests;

a validation processor, in communication with said first queue system, for validating at least said first of said plurality of requests from the second party in accordance with at least a first of said plurality of conditions between the first and second parties, said plurality of conditions being stored in a validation database associated with said validation processor;

a plurality of response processors each associated with one of the plurality of receiving gueues of the first queue system which provides responses for the first of said plurality of requests from the second party when the first of said plurality of requests is determined to be valid by the validation processor; and a firewall system interposed between the first and second parties for routing at least said first of said plurality of requests and said first of said plurality of responses between the first and second parties.

2. A system, as claimed in claim 1, wherein said first of said plurality of queues of said first queue system receives from said first of said plurality of queues of said second queue system one of (a) a service activation request to activate a first telecommunications service for a first subscriber associated with the second party, (b) a first trouble request to report trouble with at least one of the first telecommunication service for the first subscriber and a second telecommunications service for a second subscriber associated with the second party, and (c) a resend request from the second party, said resend request corresponding to a first of a plurality of call detail records for at least a first call initiated by one of a plurality of subscribers associated with the second party.

3. A system, as claimed in claim 1, wherein at least said first of said plurality of requests concerns at least a first of a plurality of trouble reports for at least one of a plurality of subscribers associated with the second party, said plurality of response processors comprising:

a trouble report processor associated with said first queue system, for processing said first of said plurality of trouble report requests received from said second party on said said plurality of receiving queues of said first queue system and for generating said first of said plurality of responses to said first of said plurality of trouble reports, said first of said plurality of responses being sendable to the second party via said plurality of transmitting queues of said first queue system.

4. A system, as claimed in claim 3, wherein said validation processor is capable of validating at least said first of said plurality of trouble reports in accordance with at least a first of the plurality of conditions between the first and second parties, said validation processor being in communication with said first party queue system.

5. A system as claimed in claim 1, wherein at least said first of said plurality of requests concern at least a first of a plurality of service activation requests for said first subscriber associated with the second party, said plurality of response processors comprising:

a mediation system, associated with said first queue system, for processing at least said first of said plurality of service activation requests received from said second party via said said plurality of receiving queues of said first queue system and for providing at least said first of said plurality of responses to said first of said plurality of service activation requests, said first of said plurality of responses being sendable to the second party via said plurality of transmitting queues of said first queue system.

6. A system, as claimed in claim 5, wherein said validation processor is capable of validating at least said first of said plurality of service activation requests in accordance with at least a first of said plurality of conditions between the first and second parties, said validation processor being in communication with said first queue system.

7. A system, as claimed in claim 1, wherein the first party is a wholesale service provider of wireless telecommunications services and the second party is a reseller of a first portion of said wireless telecommunications services of the first party to a plurality of subscribers.

8. A system, as claimed in claim 1, wherein said first and second queue systems are both on a first computer.

9. A system, as claimed in claim 1, wherein said first and second queue systems are on first and second computers, respectively.

10. A system for forwarding information from a first party to a second party in accordance with a plurality of conditions of a telecommunications contract between the first and second parties, said system comprising:

a first queue system associated with the first party having a plurality of queues, a first of said plurality of queues of said first queue system for transmitting to an associated queue in a second queue system one of at least a first of a plurality of call detail records corresponding to a first call associated with a first subscriber of the second party and a first abnormal condition report affecting at least one subscriber associated with the second party to a corresponding first queue of a second queue system associated with the second party;

a validation processor, in communication with said first queue system, for validating at least one of said first call detail report and said first abnormal condition report in accordance with at least a first of said plurality of conditions between the first and second parties, said plurality of conditions being stored in a validation database associated with said validation processor;

a call detail record system for processing at least said first call detail record, said first call detail record corresponding to at least one of a first call initiated by and a first call terminated to said first subscriber associated with the second party, said call detail record system being in communication with said first queue system; and a firewall system interposed between the first and second parties for routing at least said first of said plurality of requests and said first of said plurality of responses between the first and second parties.

11. A system, as claimed in claim 10, wherein said plurality of conditions between the first and second parties correspond to provisions in a telecommunications services contract for reselling wireless communications services.

12. A system, as claimed in claim 10, wherein said first call detail record is invalid, said system further comprising:

a contract violations database for at least storing at least said first call detail record.

13. A system, as claimed in claim 10, wherein said first call detail record is one of valid and invalid, said system further comprising:

a call detail record archives for storing at least said first call detail record.

14. A system, as claimed in claim 10, wherein said first queue system includes a second of said plurality of queues for transmitting the other of at least said first call detail record and said first abnormal condition report to a corresponding second queue of said second queue system associated with the second party.

15. A method for exchanging information between a first party and a second party in accordance with a plurality of conditions in a contract between the first and second parties said method comprising the steps of:

retrieving from a first of a plurality of queues on a first queue message system in communication with the first party at least a first of a plurality of requests sent via a corresponding queue on a second queue message system accessible by the second party;

initiating a process associated with the one of a plurality queues wherein the process relates to a first service activation request relating to a first telecommunication service for a first subscriber associated with the second party, a first trouble request to report trouble with at least one or the first telecommunication service for the first subscriber and a second telecommunication service for a second subscriber associated with the second party, and a first resend request for at least a first of a plurality of call detail records of one of the first and second subscribers associated with the second party, said one of the first and second subscribers having at least initiated a first of a plurality of calls using at least a first telecommunications network of the first party;

processing at least said first of said plurality of requests to validate said first of said plurality of requests; and responding at least to said first of said plurality of requests, if said first plurality of requests is found valid, with at least a first of a corresponding plurality of responses to the second party by sending said first of said plurality of responses to the second party on a second queue of said plurality of queues on said first queue message system, said first of said plurality of responses being receivable on a corresponding second queue of said second queue system.

16. A method, as claimed in claim 15, wherein at least said first of said plurality of requests includes said first service activation request to activate said first telecommunication service for the first subscriber, said processing step comprising the step of:

validating said first service activation request in accordance with at least a first of said plurality of conditions between the first and second parties, said first service activation request including at least a first number corresponding to the first subscriber associated with the second party.

17. A method, as claimed in claim 16, wherein said first service activation request is valid, said processing step further comprising the step of:

activating said first telecommunication service for the first subscriber, said first telecommunication service comprising at least one of call forwarding, toll call blocking, caller identification, line blocking, call waiting, conference calling, voice messaging, line blocking, long distance carrier, mobile identification number and electronic serial number services related to wireless services of the first subscriber.

18. A method, as claimed in claim 15, wherein said first of said plurality of requests comprises said first trouble request from the second party, said processing step comprising the step of:

validating said first trouble request with a least a first of said plurality of conditions between the first and second parties.

19. A method, as claimed in claim 18, wherein said first trouble request is valid, said processing step further comprising the step of:

statusing said first trouble request and generating at least a first response to said first trouble request, wherein said responding step comprises transmitting said first response to the second party on said second queue of said first queue system, wherein said first response is receivable by the second party on said corresponding second queue of said second queue system.

20. A method, as claimed in claim 18, wherein said first trouble request is invalid, said method further comprising the step of:

logging a first error response associated with said first trouble request into a contract violations database, wherein said step of responding comprises transmitting said first error response to the second party on one of said second queue and a third queue of said first queue system, said first error response being correspondingly receivable by the second party on one of said second queue and a third queue of said second queue system.

21. A method, as claimed in claim 15, wherein the first party is a wholesaler of first wireless communications and the second party is a reseller of the first wireless communications.

22. A method, as claimed in claim 15, wherein said steps of retrieving and responding utilize said first queue message system operatively associated with the first party, wherein said first queue system includes said first queue for receiving at least said first of said plurality of requests from said corresponding first queue of said second queue system associated with the second party, said second queue for transmitting at least said first of said plurality of responses to said first of said plurality of requests from the first party to said corresponding second queue of said second queue system, and a third queue for transmitting at least said first of said plurality of call detail records to a corresponding third queue of said second queue system.

23. A method, as claimed in claim 15, wherein said processing step comprises the step of validating at least said first of said plurality of requests in accordance with at least a first of the plurality of conditions, wherein said plurality of conditions are stored in a validation database.

* * * * *